US008837727B2

(12) United States Patent
Boufounos et al.

(10) Patent No.: US 8,837,727 B2
(45) Date of Patent: Sep. 16, 2014

(54) METHOD FOR PRIVACY PRESERVING HASHING OF SIGNALS WITH BINARY EMBEDDINGS

(75) Inventors: Petros T. Boufounos, Boston, MA (US); Shantanu Rane, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 276 days.

(21) Appl. No.: 13/291,384

(22) Filed: Nov. 8, 2011

(65) Prior Publication Data

US 2013/0114811 A1 May 9, 2013

(51) Int. Cl.
*G06F 21/00* (2013.01)

(52) U.S. Cl.
USPC .......... 380/255

(58) Field of Classification Search
USPC .......... 380/255
See application file for complete search history.

(56) References Cited

U.S. PATENT DOCUMENTS

| | | | | |
|---|---|---|---|---|
| 7,009,543 | B2 * | 3/2006 | Melanson | 341/143 |
| 7,043,514 | B1 * | 5/2006 | Achlioptas | 708/401 |
| 7,869,094 | B2 * | 1/2011 | Saquib | 358/3.13 |
| 8,370,338 | B2 * | 2/2013 | Gordo et al. | 707/723 |
| 2004/0264691 | A1 * | 12/2004 | Kalker | 380/1 |
| 2005/0156767 | A1 * | 7/2005 | Melanson | 341/143 |
| 2008/0021899 | A1 * | 1/2008 | Avidan et al. | 707/6 |
| 2011/0055300 | A1 * | 3/2011 | Sun et al. | 708/200 |
| 2012/0143853 | A1 * | 6/2012 | Gordo et al. | 707/723 |
| 2013/0114811 | A1 * | 5/2013 | Boufounos et al. | 380/255 |

OTHER PUBLICATIONS

"Joint watermarking and compression using scalar quantization for maximizing robustness in the presence of additive Gaussian attacks" Signal Processing, IEEE Transactions on (vol. 53 , Issue: 2 ) Date of Publication:Feb. 2005, Guixing Wu ; Dept. of Electr. & Comput. Eng., Univ. of Waterloo, Ont., Canada ; En-hui Yang.*

"Fisher-information-based data compression for estimation using two sensors" Aerospace and Electronic Systems, IEEE Transactions on (vol. 41 , Issue: 3) Fowler, M.L. ; Dept. of Electr. & Comput. Eng., Binghamton, NY, USA ; Mo Chen ; Binghamton, S. Date of Publication: Jul. 2005.*

* cited by examiner

*Primary Examiner* — Harris Wang
(74) *Attorney, Agent, or Firm* — Dirk Brinkman; Gene Vinokur

(57) ABSTRACT

A hash of signal is determining by dithering and scaling random projections of the signal. Then, the dithered and scaled random projections are quantized using a non-monotonic scalar quantizer to form the hash, and a privacy of the signal is preserved as long as parameters of the scaling, dithering and projections are only known by the determining and quantizing steps.

18 Claims, 9 Drawing Sheets

100

110

120

130

METHOD FOR PRIVACY PRESERVING HASHING OF SIGNALS WITH BINARY EMBEDDINGS

RELATED APPLICATION

This U.S. patent application is related to U.S. patent application Ser. No. 12/861,923, "Method for Hierarchical Signal Quantization and Hashing," filed by Boufounos on Aug. 24, 2010.

FIELD OF THE INVENTION

This invention relates generally to hashing a signal to preserve the privacy of the underlying signal, and more particularly to securely comparing hashed signals.

BACKGROUND OF THE INVENTION

Many signal processing, machine learning and data mining applications require comparing signals to determine how similar the signals are, according to some similarity, or distance metric. In many of these applications, the comparisons are used to determine which of the signals in a cluster of signals is most similar to a query signal.

A number of nearest neighbor search (NNS) methods are known that use distance measures. The NNS, also known as a proximity search, or a similarity search, determines the nearest data in metric spaces. For a set S of data (cluster) in a metric space M, and a query q∈M, the search determines the nearest data s in the set S to the query q.

In some applications, the search is performed using secure multi-party computation (SMC). SMC enables multiple parties, e.g., a server computes a function of input signals from one or more client to produce output signals for the client(s), while the inputs and outputs are privately known only at the client. In addition, the processes and data used by the server remain private at the server. Hence, SMC is secure in the sense that neither the client nor the server can learn anything from each other's private data and processes. Hence, hereinafter secure means that only the owner of data used for multi-party computation knows what the data and the processes applied to the data are.

In those applications, it is necessary to compare the signals with manageable computational complexity at the server, as well as a low communication overhead between the client and the server. The difficulty of the NNS is increased when there are privacy constraints, i.e., when one or more of the parties do not want to share the signals, data or methodology related to the search with other parties.

With the advent of social networking, Internet based storage of user data, and cloud computing, privacy-preserving computation has increased in importance. To satisfy the privacy constraints, while still allowing similarity determinations for example, the data of one or more parties are typically encrypted using additively homomorphic cryptosystems.

One method performs the NNS without revealing the client's query to the server, and the server does not reveal its database, other than the data in the k-nearest neighbor set. The distance determination is performed in an encrypted domain. Therefore, the computational complexity of that method is quadratic in the number of data items, which is significant because of the encryption of the input and decryption of the output is required A pruning technique can be used to reduce the number of distance determinations and obtain linear computational and communication complexity, but the protocol overhead is still prohibitive due to processing and transmission of encrypted data.

Therefore, it is desired to reduce the complexity of performing hashing computations, while still ensuring the privacy of all parties involved in the process.

The related application Ser. No. 12/861,923, describes a method that uses non-monotonic quantizers for hierarchical signal quantization and locality sensitive hashing. To enable the hierarchical operation, relatively larger values of a sensitivity parameter A enable coarse accuracy operations on a larger range of input signals, while relatively small values of parameter enable fine accuracy operations on similar input signals. Therefore, the sensitivity parameter decreases for each iteration.

As described therein, the most important parameter to select is the sensitivity parameter. This parameter controls how the hashes distinguish signals from each other. If a distance measure between pairs of signals is considered, (the smaller the distance, the more similar the signals are), then Δ determines how sensitive the hash is to distance changes. Specifically, for small Δ, the hash is sensitive to similarity changes when the signals are very similar, but not sensitive to similarity changes for signals that are dissimilar. As Δ becomes larger, the hash becomes more sensitive to signals that are not as similar, but loses some of the sensitivity for signals that are similar. This property is used to construct a hierarchical hash of the signal, where the first few hash coefficients are constructed with a larger value for Δ, and the value of Δ is decreased for the subsequent values. Specifically, using a large Δ to compute the first few hash values allows for a computationally simple rough signal reconstruction or a rough distance estimation, which provides information even for distant signals. Subsequent hash values obtained with smaller Δ can then be used to refine the signal reconstruction or refine the distance information for signals that are more similar.

That method is useful for hierarchical signal quantization. However, that method does not preserve privacy.

SUMMARY OF THE INVENTION

The embodiments of the invention provide a method for privacy preserving hashing with binary embeddings for signal comparison. In one application, one or more hashed signals are compared to determine their similarity in a secure domain. The method can be applied to approximate a nearest neighbor searching (NNS) and clustering. The method relies, in part, on a locality sensitive binary hashing scheme based on an embedding, determined using quantized random embeddings.

Hashes extracted from the signals provide information about the distance (similarity) between the two signals, provided the distance is less than some predetermined threshold. If the distance between the signals is greater than the threshold, then no information about the distance is revealed. Furthermore, if randomized embedding parameters are unknown, then the mutual information between the hashes of any two signals decreases exponentially to zero with the $l_2$ distance (Euclidian norm) between the signals. The binary hashes can be used to perform privacy preserving NNS with a significantly lower complexity compared to prior methods that directly use encrypted signals.

The method is based on a secure stable embedding using quantized random projections. A locality-sensitive property is achieved, where the Hamming distance between the hashes is proportional to the $l_2$ distance between the underlying data, as long as the distance is less than the predetermined threshold.

If the underlying signals or data are dissimilar, then the hashes provide no information about the true distance between the data, provided the embedding parameters are not revealed.

The embedding scheme for privacy-preserving NNS provides protocols for clustering and authentication applications. A salient feature of these protocols is that distance determination can be performed on the hashes in cleartext without revealing the underlying signals or data. Cleartext is stored or transmitted unencrypted, or in the clear. Thus, the computational overhead, in terms of the encrypted domain distance determination is significantly lower than the prior art that uses encryption. Furthermore, even if encryption is necessary, then the inherent nearest neighbor property obviates complicated selection protocols required in the final step to select a specified number of nearest neighbors.

In part, the method is based on rate-efficient universal scalar quantization, which has strong connections with stable binary embeddings for quantization, and with locality-sensitive hashing (LSH) methods for nearest neighbor determination. LSH uses very short hashes of potentially large signals to efficiently determine their approximate distances.

The key difference between this method and the prior art is that our method guarantees information-theoretic security for our embeddings.

DETAILED DESCRIPTION OF THE PREFERRED EMBODIMENT

Universal Scalar Quantization

Figure 1A:
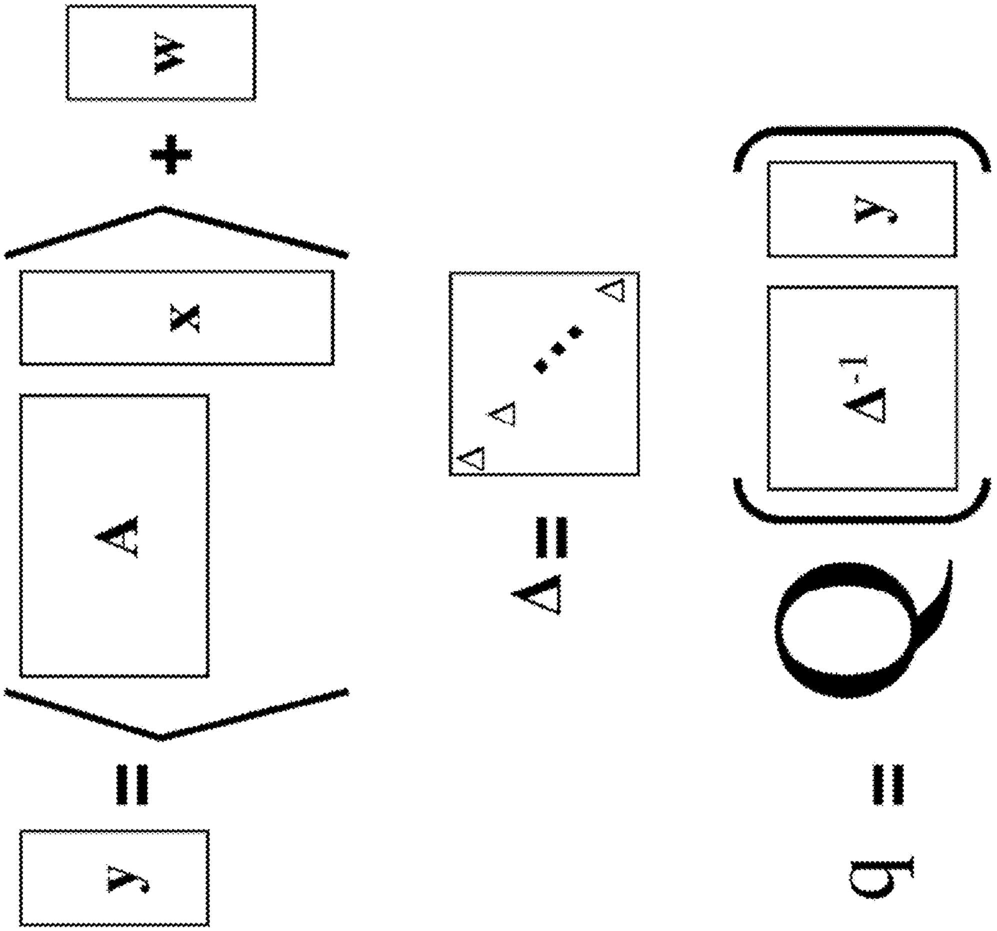
FIG. 1A is a schematic of universal scalar quantization according to embodiments of the invention.
Figure 1B:
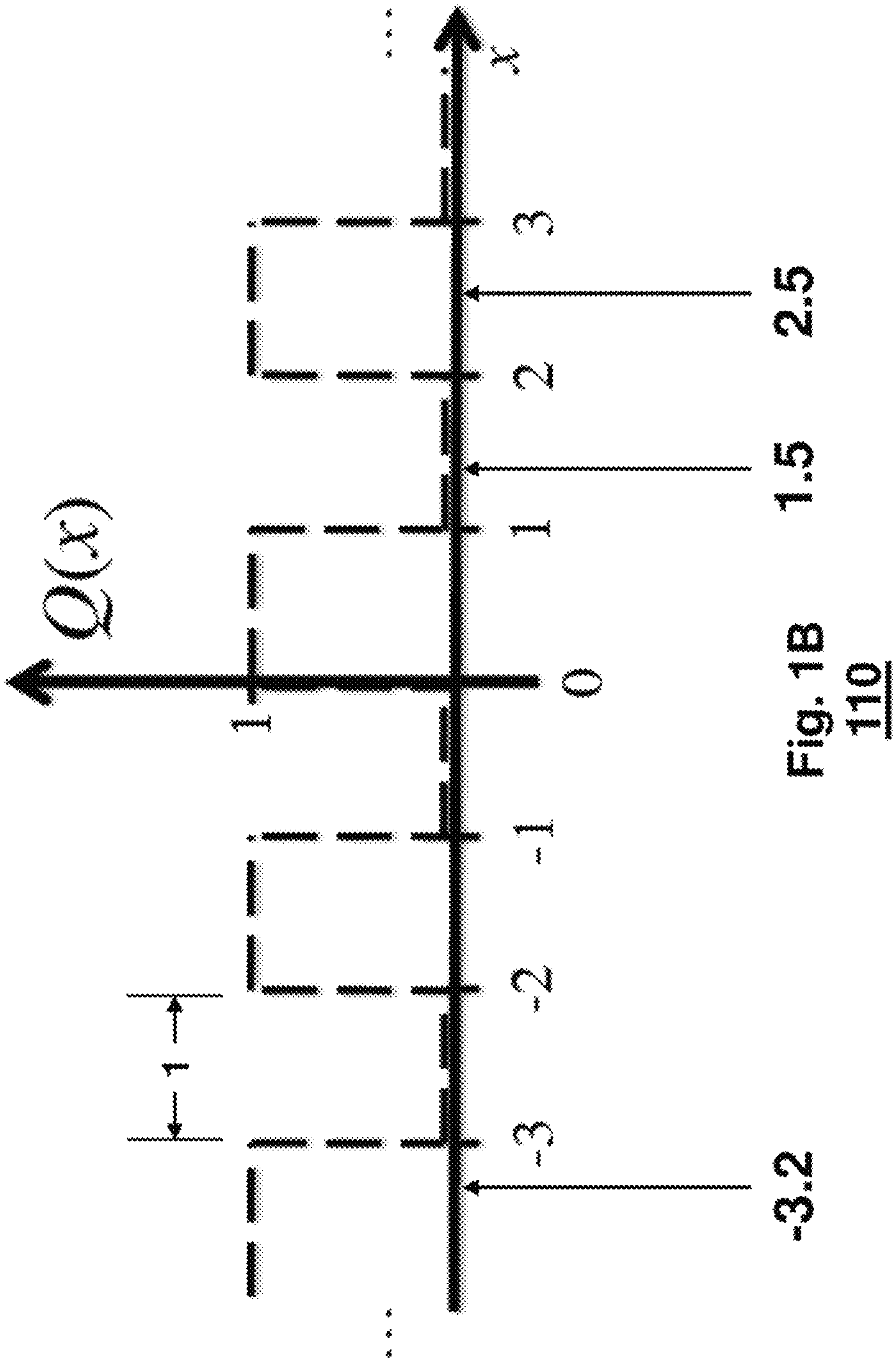
FIG. 1B is a non-monotonic quantization function with unit intervals according to embodiments of the invention.
Figure 1C:
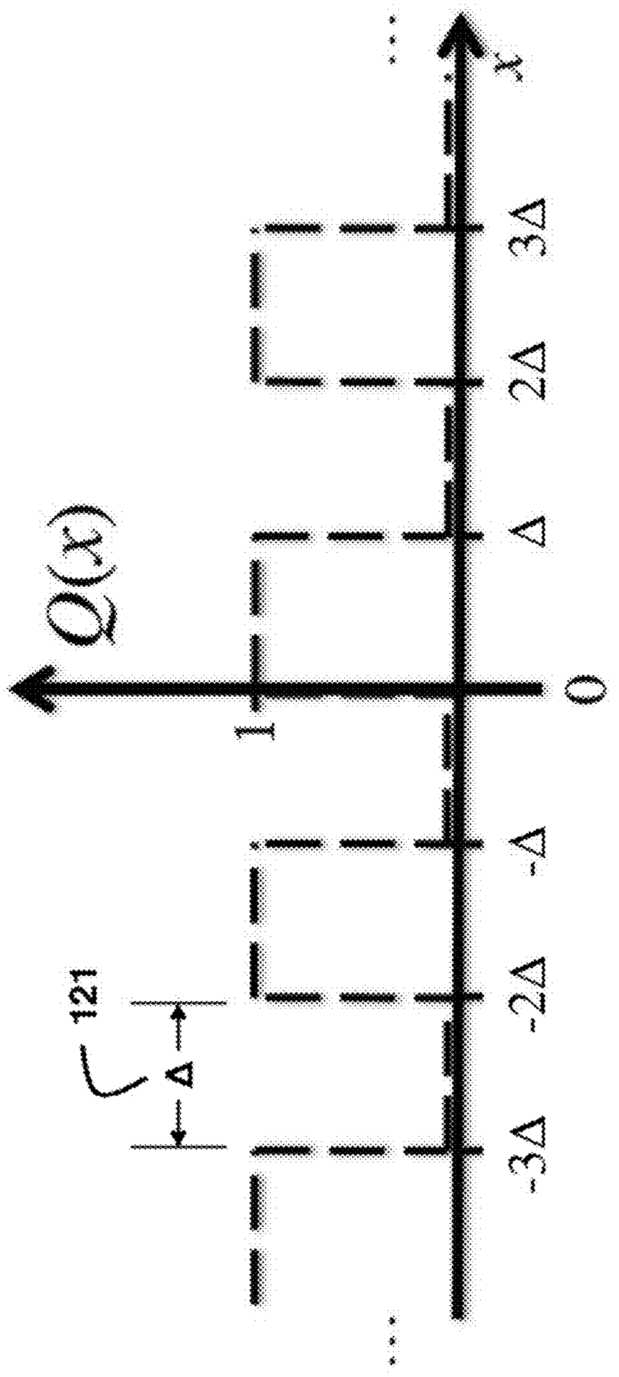
FIG. 1C is an alternative non-monotonic quantization function with sensitivity intervals according to embodiments of the invention.

As shown schematically in FIG. 1A, universal scalar quantization 100 uses a quantizer, shown in FIG. 1B or 1C with disjoint quantization regions. For a K-dimensional signal $x \in \mathfrak{R}^K$, we use a quantization process $$y_m = \langle x, a_m \rangle + w_m, \tag{1}$$

$$q_m = Q\left(\frac{y_m}{\Delta_m}\right), \tag{2}$$

represented by $$q = Q(\Delta^{-1}(Ax + w)), \tag{3}$$

as shown in FIG. 1A, and where $\langle x, a \rangle$ is a vector inner product, Ax is matrix-vector multiplication, m=1, . . . , M are measurement indices, $y_m$ are unquantized (real) measurements, $a_m$ are measurement vectors which are rows of the matrix A, $w_m$ are additive dithers, $\Delta_m$ are sensitivity parameters, and the function Q(•) is the quantizer, with $y \in \mathfrak{R}^M$, $A \in \mathfrak{R}^{M \times K}$, $w \in \mathfrak{R}^M$, and $\Delta \in \mathfrak{R}^{M \times M}$ are corresponding matrix representations. Here, Δ is a diagonal matrix with entries $\Delta_m$, and the quantizer Q(•) is a scalar function, i.e., operates elementwise on input data or signals.

It is noted, the quantization, and any other steps of methods described herein can be performed in a processor connected to memory and input/output interfaces as known in the art. Furthermore, the processor can be a client or a server.

The matrix A is random, with independent and identically distributed (i.i.d.), zero-mean, normally distributed entries having a variance $\sigma^2$. Hence, we can say that the entries in the matrix A have a Gaussian distribution. The sensitivity parameters $\Delta_m = \Delta$ is identical and predetermined for all measurements, and w is uniformly distributed in an interval [0, Δ].

Hereinafter, the parameters A, w, and Δ are known as the embedding parameters.

Note, that the sensitivity parameter in the related Application is decreasing as m increases. This is useful for hierarchical representations, but does not provide any security. This time, the parameter Δ remains constant for all m, which provides the security, as described in greater detail below.

As shown in FIG. 1B, we use the quantization function, Q(•) 100. This non-monotonic quantization function Q(•) enables universal rate-efficient scalar quantization, and provides information-theoretic security according to embodiments of the invention. In this function, a width of the intervals in the function is 1 for binary quantization levels. For example as shown in FIG. 1B, a real numbers −3.2, 1.5, and 2.5 are quantized to 1, 0 and 1, respectively.

FIG. 1C shows an alternative embodiment 120 for the function Q. Here, the interval widths are equal to the sensitivity Δ 121, which essentially replaces the division by Δ. In general the function Q describes a quantizer with discontinuous quantization regions.

Figure 1D:
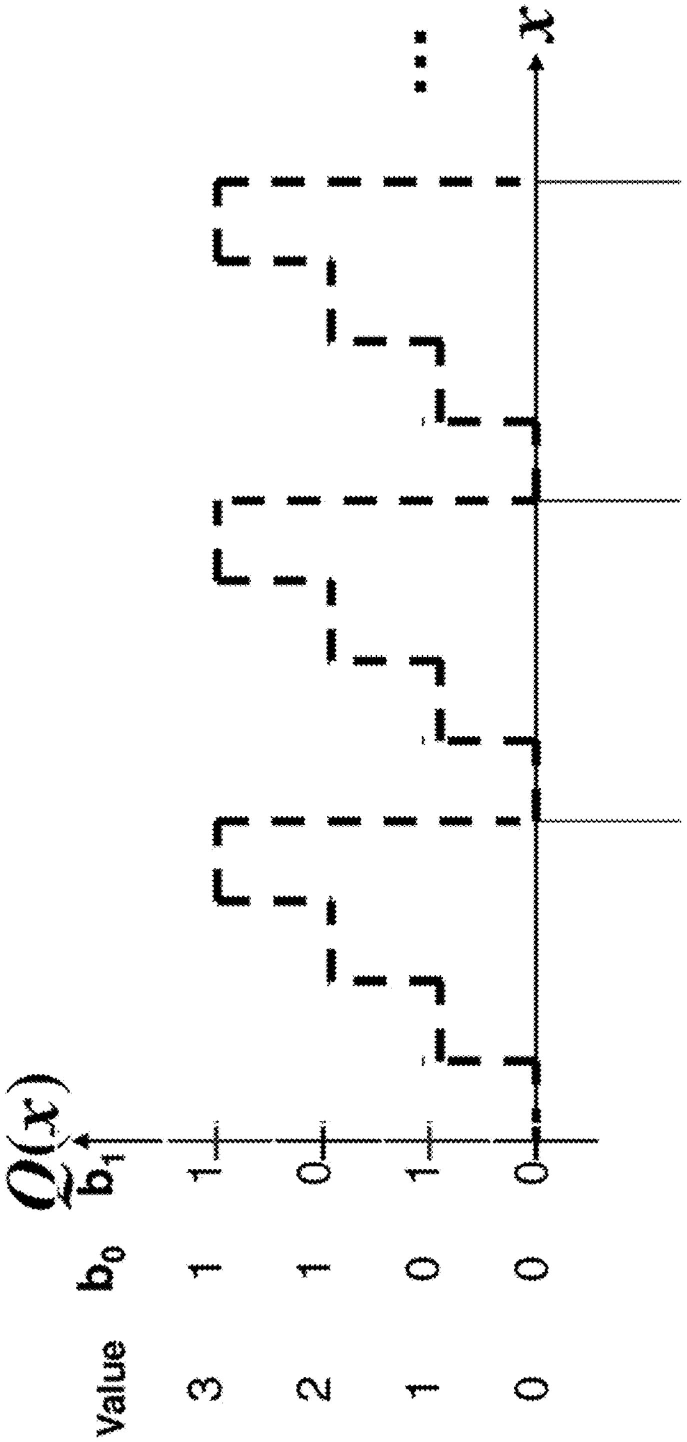
FIG. 1D is an alternative non-monotonic quantization function with multiple level intervals according to embodiments of the invention.

FIG. 1D shows an alternative embodiment 120 for the function Q. Here, the intervals correspond to multiple (multi-bit) quantization levels. For example, the value of each quantization level is encoded in the hash as two bits, $b_0$, $b_1$, instead of one bit.

Lemma I

For a similarity measurement application, the inputs are two (first and second) signals x and x' with a difference or squared distance $d = \|x - x'\|_2$, and a quantized measurement function 100 as shown in FIG. 1

$$q = Q\left(\frac{\langle x, a \rangle + w}{\Delta}\right), \tag{3.5}$$

where $Q(x)=\lceil x \rceil \bmod 2$, $a \in \mathfrak{R}^K$ contains i.i.d. elements selected from a normal distribution with a mean 0, a variance $\sigma^2$, and w is uniformly distributed in the interval $[0, \Delta]$.

Figure 2:
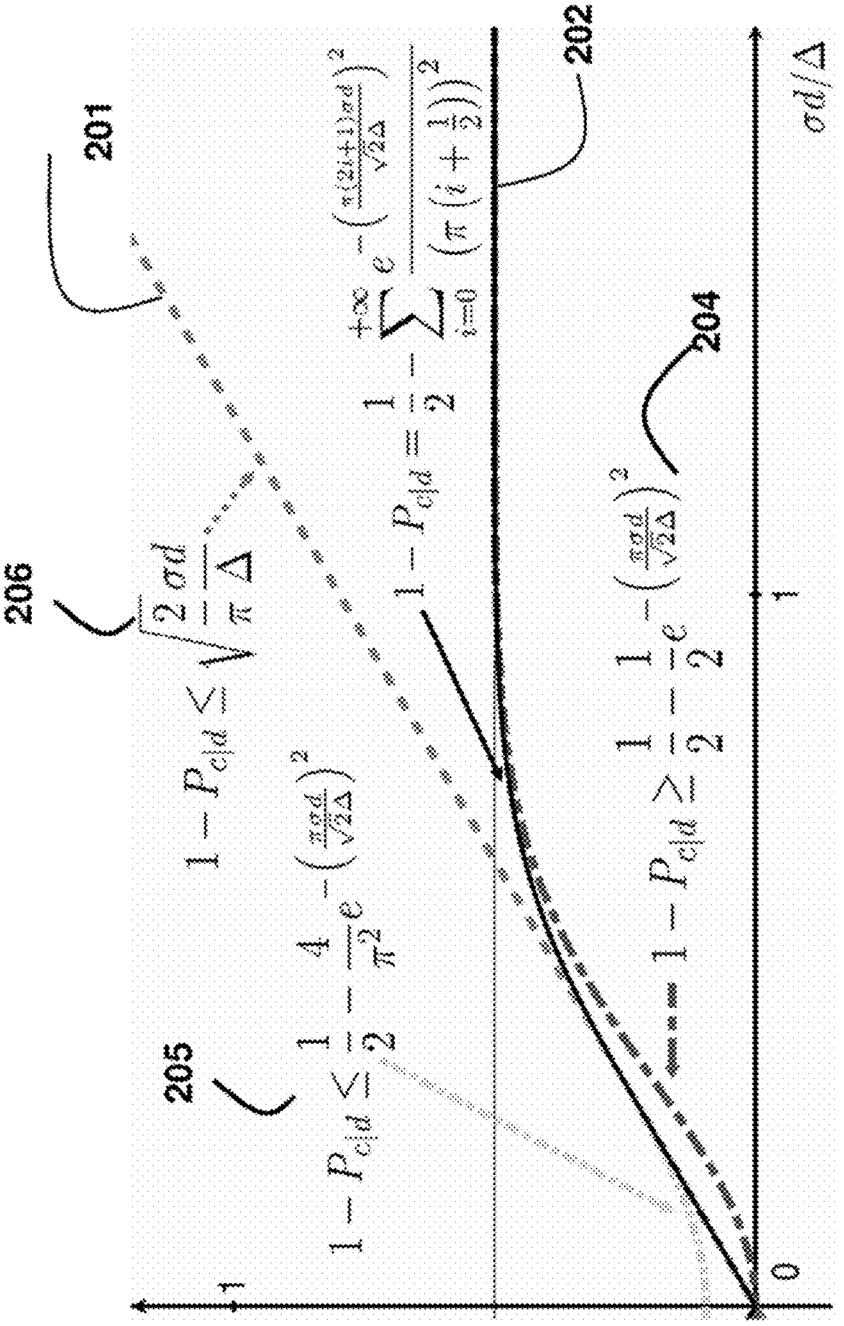
FIG. 2 is an embedding map with bounds as a function of distance between two signals according to embodiments of the invention.

As shown in FIG. 2, the probability that 202 a single measurement of the two signals produces consistent, i.e. equal, quantized measurements is $$P(x, x' \text{ consistent} \mid d) = \frac{1}{2} + \sum_{i=0}^{+\infty} \frac{e^{-\left(\frac{\pi(2i+1)\sigma d}{\sqrt{2}\Delta}\right)^2}}{(\pi(i+1/2))^2},$$

where the probability is taken over the distribution of matrix A and w. The term "consistent" means both signals produce the identical hash value, i.e. if the hash value for x is 1 then the hash value for x' is also 1, or 0 and 0 for both. In FIG. 2, probabilities are generally expressed in the form 1−P.

Furthermore, the above probability can be bound using $$P_{c|d} \le \frac{1}{2} + \frac{1}{2} e^{-\left(\frac{\pi\sigma d}{\sqrt{2}\Delta}\right)^2}, \tag{4}$$

$$P_{c|d} \ge \frac{1}{2} + \frac{4}{\pi^2} e^{-\left(\frac{\pi\sigma d}{\sqrt{2}\Delta}\right)^2}, \tag{5}$$

$$P_{c|d} \ge 1 - \sqrt{\frac{2}{\pi}} \frac{\sigma d}{\Delta}, \tag{6}$$

where $P_{c|d}$ means $P(x, x' \text{ consistent} \mid d)$ herein. Equations (4-6) correspond to 204-206 in FIG. 2. For a particular signal, each quantization bit takes the value is 0 or 1 with the same probability 0.5 as shown in FIG. 1B, for example.

Secure Binary Embedding

Our quantization process has properties similar to locality-sensitive hashing (LSH). Therefore, we refer to q, the quantized measurements of x, as the hash of x. Therefore for the purpose of this description, the terms hash and quantization are used interchangeably.

Our aim is twofold. First, we use an information-theoretic argument to demonstrate that the quantization process provides information about the distance between two signals x and x' only if the $l_2$ distance $d=\|x-x'\|_2$ is less than a predetermined threshold. Furthermore, the process preserves security of the signals when the $l_2$ distance is greater than the threshold. Second, we quantify the information provided by the hashes of the measurements by demonstrating that they provide a stable embedding of the $l_2$ distance under the normalized Hamming distance, i.e., we show that the $l_2$ distance between the two signals bounds the normalized Hamming distance between their hashes. One requirement is that the measurement matrix A and the dither w remain secret from the receiver of the hashes. Otherwise, the receiver could reconstruct the original signals. However, the reconstruction from such measurements, even if the measurement parameters A and w are known, are of a combinatorial complexity, and probably computationally prohibitive.

Information-Theoretic Security

To understand the security properties of this embedding, we consider mutual information between the $i^{th}$ bit, $q_i$ and $q'_i$, of the two signals x and x' conditional on the distance d:

$$\begin{aligned} I(q_i; q'_i \mid d) &= \sum_{q_i, q'_i \in \{0,1\}} P(q_i, q'_i \mid d) \log \frac{P(q_i, q'_i \mid d)}{P(q_i \mid d) P(q'_i \mid d)} \\ &= P_{c|d} \log(2P_{c|d}) + (1 - P_{c|d}) \log(2(1 - P_{c|d})) \\ &= \log(2(1 - P_{c|d})) + P_{c|d} \log\left(\frac{P_{c|d}}{1 - P_{c|d}}\right) \\ &\le \log\left(1 - \frac{4}{\pi^2} e^{-\left(\frac{\pi\sigma d}{\sqrt{2}\Delta}\right)^2}\right) + \left(\frac{1}{2} + \frac{1}{2} e^{-\left(\frac{\pi\sigma d}{\sqrt{2}\Delta}\right)^2}\right) \log \left(\frac{\frac{1}{2} + \frac{1}{2} e^{-\left(\frac{\pi\sigma d}{\sqrt{2}\Delta}\right)^2}}{\frac{1}{2} - \frac{4}{\pi^2} e^{-\left(\frac{\pi\sigma d}{\sqrt{2}\Delta}\right)^2}}\right) \\ &\le 10 e^{-\left(\frac{\pi\sigma d}{\sqrt{2}\Delta}\right)^2}, \end{aligned}$$

where the last step uses $\log x \le x-1$ to consolidate the expressions.

Thus, the mutual information between two length M hashes, q, q' of the two signals is bounded by the following theorem.

Theorem I

Consider two signals, x and x', and the quantization method in Lemma I applied M times to produce the quantized vectors (hashes) q and q', respectively. The mutual information between two length M hashes q and q' of the two signals is bounded by $$I(q; q' \mid d) \le 10 M e^{-\left(\frac{\pi\sigma d}{\sqrt{2}\Delta}\right)^2} \tag{7}$$

According to Theorem I, the mutual information between a pair of hashes decreases exponentially with the distance between the signals that generated the hashes. The rate of the exponential decrease is controlled by the sensitivity parameter Δ. Thus, we cannot recover any information about signals that are far apart (greater than the threshold, as controlled by Δ), just by observing their hashes.

Stable Embedding

This stable embedding is similar in spirit to a Johnson-Lindenstrauss embedding from a high-dimensional relationship between distances of signals in the signal space, and the distance of the measurements, i.e., the hashes. Because the hash is in the binary space $\{0, 1\}^M$, the appropriate distance metric is the normalized Hamming distance $$d_H(q, q') = \frac{1}{M} \sum_m (q_m \oplus q'_m).$$

We consider the quantization of vectors x and x' with an $l_2$ distance $d=\|x-x'\|_2$, as described above. The distance between each pair of individual quantization bits $(q_m \oplus q'_m)$ is a random binary value with a distribution $$P(q_m \oplus q'_m \mid d) = E(q_m \oplus q'_m \mid d) = 1 - P_{c|d}.$$

This distribution and the bounds are plotted in FIG. 2. For multi-bit quantizers, for example as in FIG. 1D, the Hamming distance could be replaced by another appropriate distance in the embedding space. For example, it could be replaced by the $l_1$ or the $l_2$ distance in the embedding space.

Using Hoeffding's inequality, which provides an upper bound on the probability for the sum of random variables to deviate from its expected value, it is straightforward to show that the Hamming distance satisfies $$P(|d_H(q,q')-(1-P_{c|d})|\geq t|d)\leq 2e^{-2t^2M} \tag{8}$$

Next, we consider a "cloud" of L data points, which we want to securely embed. Using the union bound on at most $L^2$ possible signal pairs in this cloud, each satisfying Eqn. (8), the following holds.

Theorem II

Consider a set S of L signals in $\mathfrak{R}^K$ and the quantization method of Lemma I. With probability $1-2e^{2\log L-2t^2M}$, the following holds for all pairs x, x'∈S and their corresponding hashes q, q'

$$1-P_{c|d}-t\leq d_H(q,q')\leq 1-P_{c|d}+t, \tag{9}$$

where Pc|d is defined in Lemma I, d is the $l_2$ distance, and $d_H(\bullet, \bullet)$ is the normalized Hamming distance between their hashes.

Theorem II states that, with overwhelming probability, the normalized Hamming distance between the two hashes is very close, as controlled by t, to the mapping of the $l_2$ distance defined by $1-P_{c|d}$. Furthermore, using the bounds in Eqns. (4-6), we can obtain closed form embedding bounds for Eqn. (9):

$$\frac{1}{2}-\frac{1}{2}e^{-\left(\frac{\pi\sigma d}{\sqrt{2}\Delta}\right)^2}-t\leq d_H(q,q')\leq\frac{1}{2}-\frac{4}{\pi^2}e^{-\left(\frac{\pi\sigma d}{\sqrt{2}\Delta}\right)^2}+t, \tag{10}$$

FIG. 2 shows the mapping 1−Pc|d, together with its bounds. The mapping 201 is linear for small d, and becomes essentially flat 202, therefore not invertible, for large d, with the scaling is controlled by the sensitivity parameter Δ. Furthermore, it is clear in FIG. 2 that the upper bounds 201, $$1-P_{c|d}\leq\sqrt{\frac{2}{\pi}}\frac{\sigma d}{\Delta}, \tag{11}$$

and $$1-P_{c|d}\leq\frac{1}{2}-\frac{4}{\pi^2}e^{-\left(\frac{\pi\sigma d}{\sqrt{2}\Delta}\right)^2}, \tag{12}$$

are very tight for small and large d, respectively, and can be used as approximations of the mapping. Of course, the results of Theorem II, and the bounds on the mapping, can be reversed to provide guarantees on the $l_2$ distance as a function of the Hamming distance.

Figure 3B:
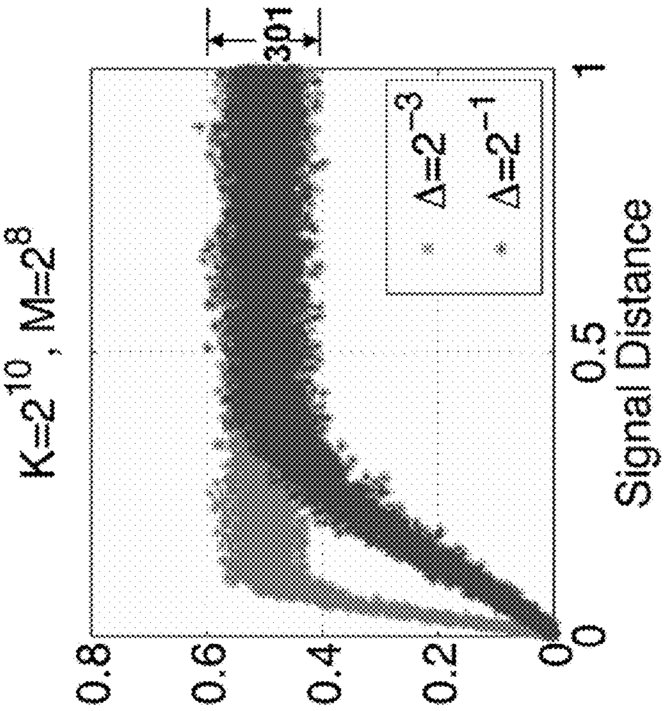
FIG. 3A-3B are graphs of the embedding behavior of Hamming distances as a function of signal distances according to embodiments of the invention.
Figure 3A:
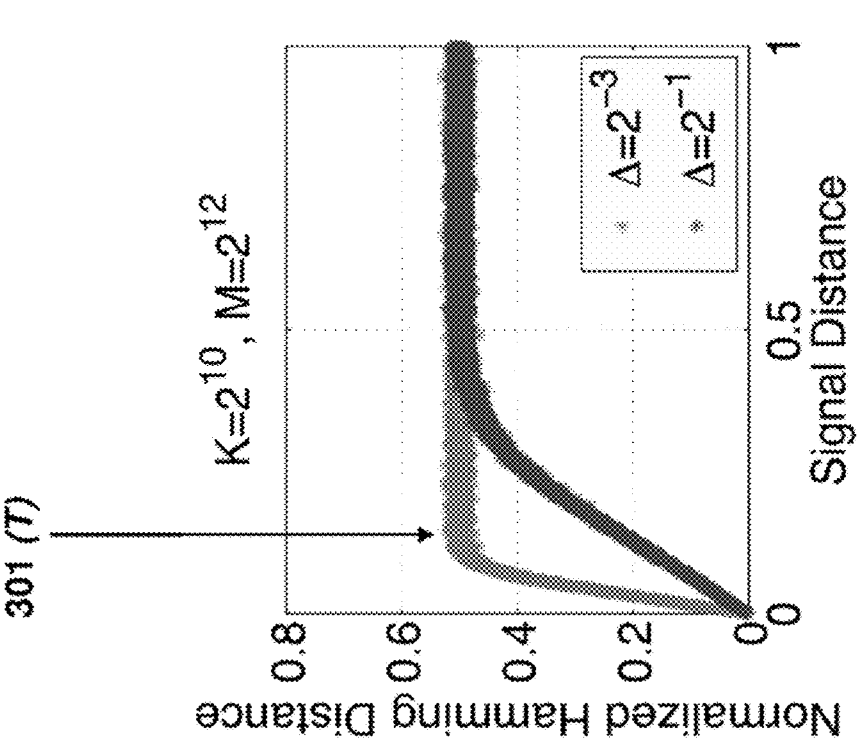

FIGS. 3A-3B show how the embedding behaves in practice. The Figs. show results on the normalized Hamming distance between pairs of hashes as a function of the distance between the signals that generated the distances. The figures show the significant characteristics of our secure hashing. For all distances larger than the threshold T 301, the normalized distance response is flat, and nothing can be learned of the actual distance, since the normalized hamming distance is identical for all $l_2$ distances. However, for distances smaller than the threshold, the normalized Hamming distance is approximately proportional to the actual distance.

In the example shown, the signals are randomly generated in $\mathfrak{R}^{1024}$, i.e., $K=2^{10}$. The plot in FIG. 3A uses $M=2^{12}=4096$ measurements per hash, i.e., four bits per coefficient. The plot in FIG. 3B uses $M=2^8=256$ measurements per hash, i.e., ¼ bit per coefficient. Two different A are used in each plot, $\Delta=2^{-3}$, $2^{-1}$. For the larger Δ, the slope of the linear part of the embedding increases, and a larger range of $l_2$ distances can be identified. This reduces security because information is revealed for signals at larger distances. Furthermore, for a smaller number of hashing bits M the width 301 of the linear region increases, which increases the uncertainty in inverting the map in the linear region. On the other hand, as the number of hashing bits M increases, the embedding becomes tighter at the expense of larger bandwidth requirements. This means that the $l_2$ distance between near neighbors can be more accurately estimated from the hashes. Note that a similar uncertainty on the exact mapping between distances of signals exists even if the signals are quantized, and then compared in the encrypted domain using, for example, a homomorphic cryptosystem.

This behavior is consistent with the information-theoretic security described above for the embedding. For small distance d, there is information provided in the hashes, which can be used to find the distance between the signals. For larger distances d, information is not revealed. Therefore, it is not possible to determine the distance between two signals from their hashes, or any other information.

Applications

We describe various applications where a nearest neighbor search based on the hashes is particularly beneficial. We assume that all parties are semi-honest, i.e., the parties follow the rules of the protocol, but can use the information available at each step of the protocol to attempt to discover the data held by other parties.

In all of the protocols described below, we assume that the embedding parameters A, w and Δ are selected such that the linear proportionality region in FIG. 2 extends at least up to an $l_2$ distance of D. Within this proportionality region, denote by $D_H$, the normalized Hamming distance between hashes corresponding to the $l_2$ distance of D between the underlying signals. Recall, outside the linear proportionality region, the embedding has a flat response, and is non-invertible and therefore secure. In other words, if the distance between two signals is outside the linear proportionality region, then one cannot obtain any information about the signals by observing their hashes.

Privacy Preserving Clustering with a Star Topology

Figure 4:
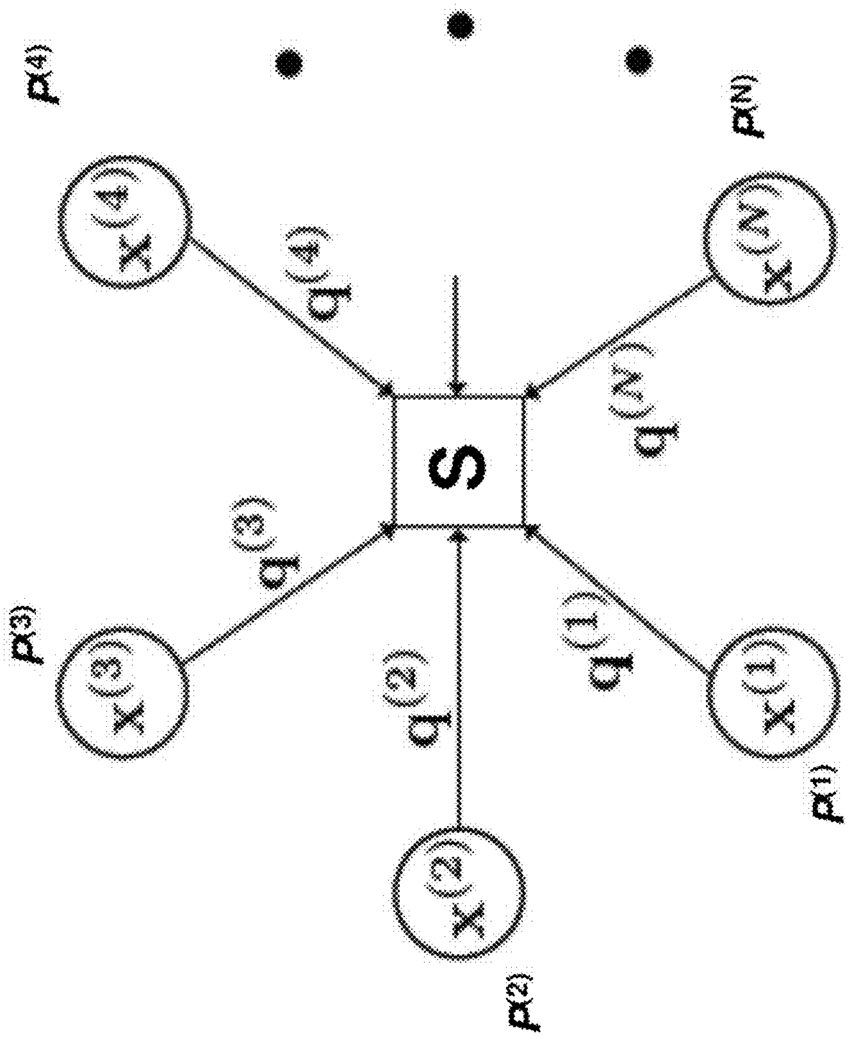
FIG. 4 is a schematic of approximate secure nearest neighbor clustering for star-connected parties according to embodiments of the invention.

In this application as shown in FIG. 4, we take advantage of the property that, when the embedding matrix A and the dither vector w are unknown, no information is revealed about the vector x by observing the corresponding hash. In this application, multiple client parties $P^{(i)}$ provide data $x^{(i)}$ to be analyzed by a server S. The goal is to allow S to cluster the data and organize the clients P into classes without revealing the data. For each client, the server obtains the approximate nearest neighbors of the client within the $l_2$ distance of D.

Protocol: The protocol is summarized in FIG. 4.

1) All the parties identically obtain the random embedding matrix A, the dither vector w, and the sensitivity parameter Δ. One way to accomplish this is for one client party to transmit A, w and Δ to the other client parties using public encryption keys of the recipients.
2) Each client, for $i\in I=\{1, 2, \ldots, N\}$, determines $q^{(i)}=Q(\Delta^{-1}(Ax^{(i)}+w))$, and transmits $q^{(i)}$ to the server S as plaintext.
3) Corresponding to each party $P^{(i)}$, the server constructs a set $C=\{i|d_H(q, q^{(i)})\leq D_H\}$.

From Eqn. (9), we know that the elements of $C_1$ are the approximate nearest neighbors of the party $P^{(i)}$. Owing to the properties of the embedding, the server can perform clustering using the binary hashes in cleartext form, without discovering the underlying data $x^{(i)}$. Thus, apart from the initial one-time preprocessing overhead incurred to communicate the parameters A, w and Δ to the N parties, encryption is not needed in this protocol for any subsequent processing.

This is in contrast with protocols that need to perform distance calculation based on the original data $x^{(i)}$, which require the server to engage in additional sub-protocols to determine $O(N^2)$ pairwise distances in the encrypted domain using homomorphic encryption.

Authentication Using Symmetric Keys

Figure 5:
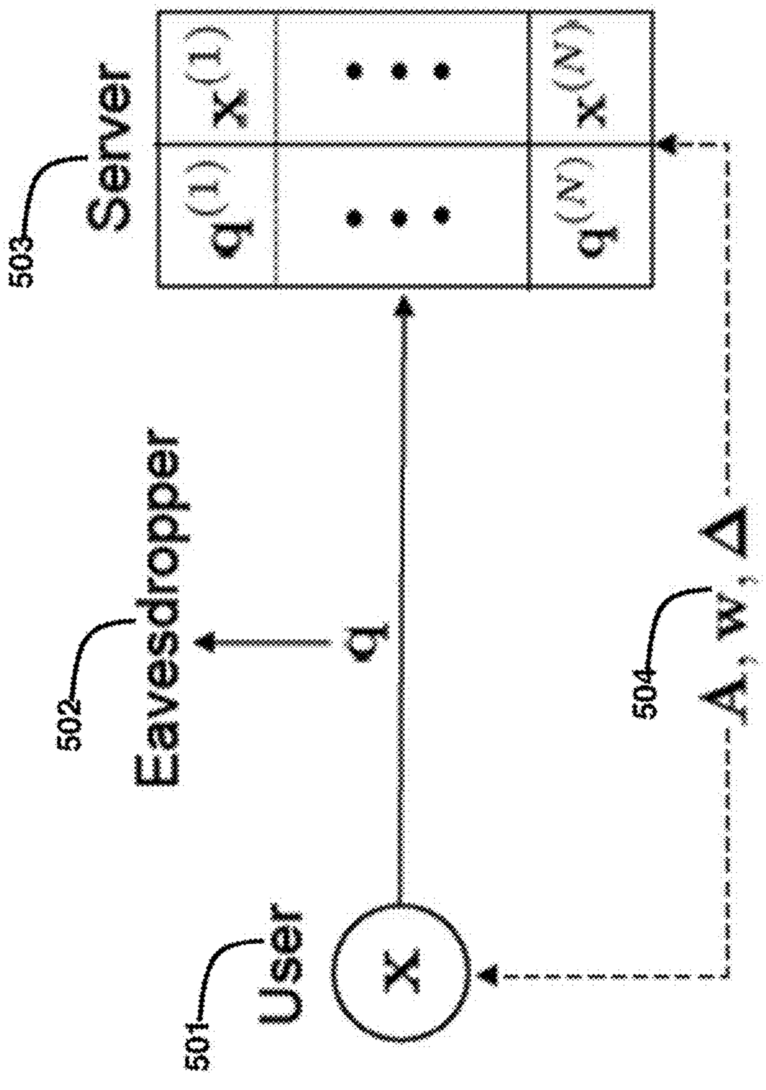
FIG. 5 is a schematic of user authentication by a server in the presence of an eavesdropper according to embodiments of the invention.

In this application as shown in FIG. 5, we authenticate using a vector x derived, for example, from biometric parameters or an image. The goal is to authenticate a user x with a trusted server without revealing the data x to a possible eavesdropper. If the goal is authentication, then the client user claims an identity and the server determine whether the submitted authentication hash vector q is within a predefined $l_2$ distance from an enrollment hash vector $q^{(N)}$ vector stored in a database at the server. If the goal is identification, the server determines whether or not the submitted vector is within a predefined $l_2$ distance from at least one enrollment vector stored in its database. We perform the authentication in a subspace of quantized random embeddings. Here, the embedding parameters (A, w, Δ) serves as a symmetric key known only to the client and the trusted authentication server, but not to the eavesdropper. The protocol for the user identification scenario is described below. The authentication protocol proceeds similarly.

The user of the client has a vector x to be used for identification. The server has a database of N enrollment vectors $x^{(i)}$, $i \in I = \{1, 2, \ldots, N\}$. The user and the server (but not the eavesdropper) have embedding parameters (A, w, Δ).

The server determines the set C of approximate nearest neighbors of the vector x within the $l_2$ distance of D. If C=Ø, i.e., is empty, then user the identification has failed, otherwise the user is identified as being near at least one legitimate enrolled user in the database. The eavesdropper obtains no information about x.

Protocol: The protocol transmissions are summarized in FIG. 5.

1) The user 501 determines $q=Q(\Delta-1(Ax+w))$, and transmits q to the server as plaintext.
2) The server 503 determines $q^{(i)}=Q(\Delta^{-1}(Ax^{(i)}+w))$ for all i.
3) The server constructs the set $C=\{i|d_H(q, q^{(i)}) \le D_H\}$.

Again, from Eqn. (9), we see that the set C contains the approximate nearest neighbors of x. If C=Ø, then identification has failed, otherwise the user has been identified as having one of the indices in C. Because the eavesdropper 502 does not know (A, w, Δ) 504, the quantized embeddings do not reveal information about the underlying vector. This protocol does not require the user to encrypt the hash before transmitting the hash to the authentication server. In terms of the communication overhead, this is an advantage over conventional nearest neighbor searches, which require that the client transmits the vector to the server in encrypted form to hide it from the eavesdropper.

As a variation, to design a protocol for an untrusted server, we can stipulate that the server only stores $q^{(i)}$, not $x^{(i)}$ and does not possess the embedding parameters (A, w, Δ). If the authentication server is untrusted, the client users do not want to enroll using their identifying vectors $x^{(i)}$. In this case, change the above protocol so that only the users (but not the server) possess (A, w, Δ).

The users enroll in the server's database using the hashes $q^{(i)}$, instead of the corresponding data vectors $x^{(i)}$. The hashes are the only data stored on the server. In this case, because the server does not know (A', w, Δ), the server cannot reconstruct $x^{(i)}$ from $q^{(i)}$. Further, if the database is compromised, then the $q^{(i)}$ can be revoked and new hashes can be enrolled using different embedding parameters (A', w', Δ').

Privacy Preserving Clustering with Two Parties

Figure 6:
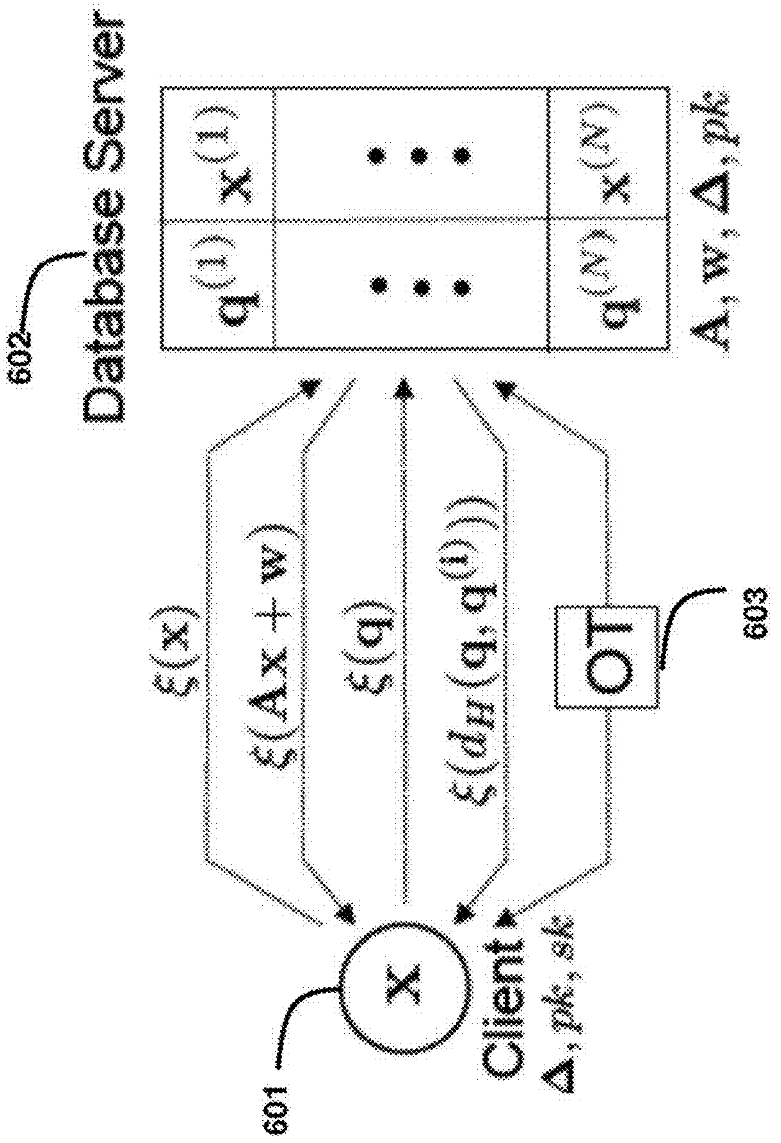
FIG. 6 is a schematic of approximating nearest neighbors of a query using locality-sensitive hashing according to embodiments of the invention.

Next as shown in FIG. 6, we consider a two-party protocol in which a client 601 initiates a query to a database server 602. The privacy constraint is that the query is not revealed to the server, and the client can only learn the vectors in the database server that are within a predefined $l_2$ distance from its query. Unlike the earlier protocol for star topology, it is now necessary to use a homomorphic cryptosystem scheme, such as the probabilistic asymmetric Paillier cryptosystem for public key cryptography, to perform simple operations in the encrypted domain.

The additively homomorphic property of the Paillier cryptosystem ensures that $\xi_p(a)\xi_q(b)=\xi_{pq}(a+b)$, where a and h are integers in a message space, and is the encryption function. The integers p and q are randomly selected encryption parameters, which make the Paillier cryptosystem semantically secure, i.e., by selecting the parameters p, q at random, one can ensure that repeated encryptions of a given plaintext results in different ciphertexts, thereby protecting against chosen plaintext attacks (CPAs). For simplicity, we drop the suffixes p, q from our notation. As a corollary to the additively homomorphic property, $\xi(a)b=\xi(ab)$.

The client has the query vector x. The server has a database of N vectors $x^{(i)}$, for I=1, . . . , N. The server generates (A, w, Δ) and makes Δ public. The client obtains C̲, the set of approximate nearest neighbors of the query vector x within the $l_2$ distance of D. If no such vectors exist, then the client obtains C=Ø.

Protocol: The protocol transmissions are summarized in FIG. 6.

1) The client generates a public encryption key pk, and secret decryption key sk, for Paillier encryption. Then, the client performs elementwise encryption of x, denoted by $\xi(x)=(\xi(x_1), \xi(x_2), \ldots, \xi(x_k))$. The client transmits $\xi(x)$ to the server.
2) The server uses the additively homomorphic property to determine $\xi(y)=\xi(Ax+w)$ and returns $\xi(y)$ to the client.
3) The client decrypts y and determines $q=\Delta^{-1}y$, and transmits $\xi(q)$ to the server.
4) The server determines the hashes $q^{(i)}=Q(\Delta^{-1}(Ax^{(i)}+w))$.
5) The server uses homomorphic properties to determine the encryption of the Hamming distances between the quantized query vector and the quantized database vectors, i.e., it determines $d_H(q, q^{(i)})$:

$$
\begin{aligned}
\xi(Md_H(q, q_i)) &= \xi\left(\sum_{m=1}^{M} q_m \oplus q_m^{(i)}\right) \\
&= \prod_{m=1}^{M} \xi(q_m \oplus q_m^{(i)}) \\
&= \prod_{m=1}^{M} \xi(q_m + q_m^{(i)} - 2q_m q_m^{(i)}) \\
&= \prod_{m=1}^{M} \xi(q_m)\xi(q_m^{(i)})\xi(q_m)^{-2q_m^{(i)}}
\end{aligned}
$$

transmits the encrypted distances to the client.

6) The client decrypts $d_H(q, q^{(i)})$, and obtains the set $D=\{i|d_H(q, q^{(i)}) \le D_H$.
7) If D=0, the protocol terminates. If not, the client performs a |D|-out-of-N oblivious transfer (OT) protocol with the server to retrieve $C=\{x^{(i)}\}$. The OT guarantees that the client does not discover any of the vectors $x^{(i)}$ such that $i \notin D$, while ensuring that the query set D is not revealed to the server.

From Eqn. (9), the set C contains the approximate nearest neighbors of the query vector x. Consider the advantages of determining the distances in the hash subspace versus encrypted-domain determination of distance between the underlying vectors. For a database of size N, determining the distances between the vectors reveals all N distances $\|x-x^{(i)}\|_2$. A separate sub-protocol is necessary to ensure that only the distances corresponding to the nearest neighbors, i.e., the local distribution of the distances, is revealed to the client.

In contrast, our protocol only reveals distances if $\|x-x^{(i)}\|_2 \leq D$. If $\|x-x^{(i)}\|_2 > d$, then the Hamming distances determined using the quantized random embeddings are no longer proportional to the true distances. This prevents the client from knowing the global distribution of the vectors in the database of the server, while only revealing the local distribution of vectors near the query vector.

Effect of the Invention

We describe a secure binary method using quantized random embeddings, which preserves the distances between signal and data vectors in a special way. As long as one vector is within a pre-specified distance d from another vector, the normalized Hamming distance between their two quantized embeddings is approximately proportional to the $l_2$ distance between the two vectors. However, as the distance between the two vectors increases beyond d, then the Hamming distance between their embeddings becomes independent of the distance between the vectors.

The embedding further exhibits some useful privacy properties. The mutual information between any two hashes decreases to zero exponentially with the distance between their underlying signals.

We use this embedding approach to perform efficient privacy-preserving nearest neighbor search. Most prior privacy-preserving nearest neighbor searching methods are performed using the original vectors, which must be encrypted to satisfy privacy constraints.

Because of the above properties, our hashes can be used, instead of the original vectors. to implement privacy-preserving nearest neighbor search in an unencrypted domain at significantly lower complexity or higher speed. To motivate this, we describe protocols in low-complexity clustering, and server-based authentication.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for hashing a signal, comprising the steps of:

determining, by a processor, dithered and scaled random projections of the signal by defining embedding parameters A, w, Δ and calculating $y=\Delta^{-1}(Ax+w)$, where A is a randomly generated projection matrix, Δ is a diagonal matrix of identical and predetermined sensitivity parameters, and w is a vector of additive dithers uniformly distributed in an interval [0, Δ];

and quantizing, by a processor, the dithered and scaled random projections using a non-monotonic scalar quantizer to form a hash, wherein a privacy of the signal is preserved as long as parameters of the scaling, dithering and projections are only known by the determining and quantizing steps.

2. The method of claim 1, in which the matrix A is generated randomly by drawing independent and identically distributed matrix elements.

3. The method of claim 2, in which the drawing is from the normal distribution.

4. The method of claim 1, wherein hashes $q^{(i)}$ of a plurality of signals are compared to securely determine a similarity of the plurality of signals.

5. The method of claim 4, wherein the similarity is in terms of a distance, and wherein the plurality of signals are similar if the distance is less than a predetermined threshold.

6. The method of claim 4, wherein an embedding distance between the hashes is proportional to $l_2$ distances between the signals as long as the distance is less than a predetermined threshold.

7. The method of claim 6, wherein an embedding distance between the hashes is a Hamming distance in a binary space.

8. The method of claim 4, wherein the hashes do nor reveal information about dissimilar signals as long as the distances are greater than a predetermined threshold.

9. The method of claim 4, wherein the comparing approximates a nearest neighbor searching of the plurality of signals.

10. The method of claim 4, further comprising:

performing clustering on the plurality of signals according to the hashes $q_n$.

11. The method of claim 4, wherein the distance determination is performed on the hashes in cleartext without revealing the plurality of signals.

12. The method of claim 1, wherein the hash uses a non-monotonic quantization function with width intervals equal to the diagonal matrix of identical and predetermined sensitivity parameters Δ.

13. The method of claim 1, wherein the hash uses a multiple quantization levels.

14. The method of claim 4, wherein each of the plurality of signals is provided by a corresponding client to a server, and further comprising:

organizing the clients into classes without revealing the signals.

15. The method of claim 14, wherein A, w, and Δ are embedding parameters, and each client obtains a copy of the embedding parameters using public encryption keys;

determining, in each $client_i$, $q^{(i)}=Q(\Delta^{-1}(Ax^{(i)}+w))$, and transmits $q^{(i)}$ to the server as plaintext;

constructing, in the server, a set $C=\{i|d_H(q, q^{(i)})\leq D_H$, wherein $D_H$ is a proportionality region.

16. The method of claim 4, wherein one of the signals is an authentication key of a user stored at a client, and the other signals are enrollment keys stored at a server.

17. The method of claim 16, wherein the authentication key and the enrollment keys are based on biometric parameters, and further comprising:

determining, at the client, $q=Q(\Delta-1(Ax+w))$;

transmitting q to the server as plaintext;

determining, at the server, $q^{(i)}=Q(\Delta^{-1}(Ax^{(i)}+w))$ for all I; and constructing, at the server, a set $C=\{i|d_H(q, q^{(i)})\leq D_H\}$, wherein $D_H$ is a proportionality region.

18. The method of claim 4, wherein one of the signals is a query stored at a client, and the other i signals are vectors stored at a server.

* * * * *